(12) United States Patent
Kim et al.

(10) Patent No.: US 9,023,495 B2
(45) Date of Patent: May 5, 2015

(54) UNIT THERMIONIC ELECTRIC CONVERTER AND THERMOELECTRIC CONVERTER SYSTEM

(75) Inventors: Ju-Yong Kim, Yongin-si (KR);
Byung-Joo Chung, Yongin-si (KR);
Tae-Yoon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 986 days.

(21) Appl. No.: 12/969,545

(22) Filed: Dec. 15, 2010

(65) Prior Publication Data

US 2011/0303257 A1 Dec. 15, 2011

(30) Foreign Application Priority Data

Jun. 10, 2010 (KR) ........................ 10-2010-0055105

(51) Int. Cl.
| | |
|---|---|
| *H01M 6/36* | (2006.01) |
| *H01L 35/28* | (2006.01) |
| *H01M 10/36* | (2010.01) |
| *H02N 3/00* | (2006.01) |

(52) U.S. Cl.
CPC ...................................... *H02N 3/00* (2013.01)

(58) Field of Classification Search
None
See application file for complete search history.

(56) References Cited

U.S. PATENT DOCUMENTS

| | | | | |
|---|---|---|---|---|
| 4,098,958 | A | * | 7/1978 | Bettman ........................ 429/415 |
| 5,085,948 | A | | 2/1992 | Tsukamoto et al. |
| 5,521,029 | A | * | 5/1996 | Fiorino et al. ................ 205/150 |
| 6,239,350 | B1 | | 5/2001 | Sievers et al. |

FOREIGN PATENT DOCUMENTS

| | | | |
|---|---|---|---|
| JP | 09-199764 | | 7/1997 |
| JP | 2000048833 A | * | 2/2000 |
| JP | 2001-176536 | | 6/2001 |
| JP | 2007-033128 | | 2/2007 |
| JP | 2007-088039 A | | 4/2007 |
| JP | 2009-181861 | | 8/2009 |

OTHER PUBLICATIONS

KIPO Notice of Allowance dated Mar. 30, 2012 issued in the priority Korean application No. 10-2010-0055105 (5 pages).
KIPO issued Office action dated Aug. 18, 2011 issued in Application No. KR 10-2010-055105, 4 pages.
English Machine Translation of JP 2007-088039, 36 pages.

* cited by examiner

*Primary Examiner* — Patrick Ryan
*Assistant Examiner* — Adam A Arciero
(74) *Attorney, Agent, or Firm* — Christie, Parker & Hale, LLP

(57) ABSTRACT

A unit thermionic electric converter. The unit thermionic electric converter includes a case having a first end portion and a second end portion; a working fluid disposed inside the case; a solid electrolyte dividing the inside of the case; a first electrode disposed on a surface of the solid electrolyte; and a second electrode disposed on another surface of the solid electrolyte; wherein the first end portion and the second end portion are alternately heated by a heat source.

14 Claims, 10 Drawing Sheets

UNIT THERMIONIC ELECTRIC CONVERTER AND THERMOELECTRIC CONVERTER SYSTEM

CROSS-REFERENCE TO RELATED APPLICATION

This application claims priority to and the benefit of Korean Patent Application No. 10-2010-0055105, filed on Jun. 10, 2010, in the Korean Intellectual Property Office, the entire content of which is incorporated herein by reference.

BACKGROUND

1. Field

One or more embodiments of the present invention relate to a unit thermionic electric converter and a thermoelectric converter system, and more particularly, to structures of a unit thermionic electric converter and a thermoelectric converter system.

2. Description of the Related Art

As the importance of energy increases, the importance of a technology capable of recovering waste heat to save on energy is increasing. A waste heat recovery technology is generally used to recover waste heat in the form of hot water, combustion air, and/or steam by using a heat exchanger and/ or a waste heat boiler. Thus, the waste heat technology is used to increase or maximize efficiency of a system's technical and/or economical operations.

In general, waste heat recovery apparatuses are large, and thus there are many restrictive factors for its installation environment. When a large-capacity heat exchanger for industrial use and/or power generation is brought in, a high facility cost is required. Accordingly, an advanced use plan and countermeasure for installation investment are required, and thorough operation management after the installation is also required. Also, when power is generated by recovering waste heat, peripheral supply facilities including a steam generating equipment, a turbine, and a compressor are generally required. Thus, a method of recovering waste heat to generate power needs to be sufficiently technological and economical considered, and in particular, economic feasibility should be checked. Unlike a conventional power generation method, an alkali metal thermal to electric converter (AMTEC) is comprised of power generation cells in which a heat exchanging surface thereof itself may generate power without the need to use facilities such as a turbine or a boiler. Accordingly, an AMTEC may directly generate power at a portion that contacts a heat source and may modularize the power generation cells by connecting the power generation cells in parallel or series, thereby enabling large-capacity power of several kW to several hundreds of MW to be generated.

Besides various industrial waste heats, various heat sources, such as reactive heat of a nuclear reactor, solar heat, geothermal heat, and fossil energy, may be used. An AMTEC may be easily used to generate power by being combined with a conventional system.

SUMMARY

One or more aspects of one or more embodiments of the present invention are directed toward a unit thermionic electric converter and a thermoelectric converter system that have a simple structure and operate continuously.

Additional aspects will be set forth in part in the description which follows and, in part, will be apparent from the description, or may be learned by practice of the presented embodiments.

According to one or more embodiments of the present invention, a unit thermionic electric converter includes: a case having a first end portion and a second end portion; a working fluid inside the case; a solid electrolyte dividing the inside of the case; a first electrode on a surface of the solid electrolyte; and a second electrode on another surface of the solid electrolyte, wherein the first end portion and the second end portion are configured to be alternately heated by a heat source.

In one embodiment, the heat source includes: a first heat source for heating the first end portion; and a second heat source for heating the second end portion.

In one embodiment, the unit thermionic electric converter further includes a driving unit for moving the case in such a way that the first end portion and the second end portion are alternately heated by the heat source, wherein the heat source is fixed on a base surface.

In one embodiment, the unit thermionic electric converter further includes a power generation unit electrically connected to the first electrode and the second electrode and configured to control power of the thermionic electric converter.

In one embodiment, the unit thermionic electric converter further includes a transmission member for fluidly connecting a first space with a second space, wherein the solid electrolyte divides the inside of the case into the first space corresponding to the first end portion and the second space corresponding to the second end portion.

In one embodiment, the unit thermionic electric converter further includes a transmission driving unit for moving the working fluid from a first space to the second space or from the second space to the first space by fluidly connecting the first space with the second space, wherein the solid electrolyte divides the inside of the case into the first space corresponding to the first end portion and the second space corresponding to the second end portion.

In one embodiment, the working fluid includes an alkali-based metal.

In one embodiment, the working fluid includes sodium (Na).

In one embodiment, the first electrode includes a first porous electrode and a first current collector, and the second electrode includes a second porous electrode and a second current collector. In one embodiment, the first porous electrode and the second porous electrode each include titanium nitride (TiN). In one embodiment, the first current collector and the second current collector each include molybdenum (Mo).

In one embodiment, the solid electrolyte includes $\beta''$-alumina ($\beta''$-$Al_2O_3$).

An embodiment of the present invention provides a thermoelectric converter system includes a plurality of unit thermionic electric converters and a heat source adjusting device. Each of the unit thermionic electric converters includes: a case having a first end portion and a second end portion; a working fluid inside the case; a solid electrolyte dividing the inside of the case; a first electrode on a surface of the solid electrolyte; and a second electrode on another surface of the solid electrolyte. Here, the first end portion and the second end portion are configured to be alternately heated by a heat source, and the heat source adjusting device is configured to adjust a heating time of the plurality of unit thermionic electric converters.

In one embodiment, the thermoelectric converter system further includes a power generation unit for controlling power generated in each of the unit thermionic electric converters.

In one embodiment, the heat source of each of the unit thermionic electric converters includes a first heat source at the first end portion and a second heat source at the second end portion.

In one embodiment, the thermoelectric converter system further includes a driving unit for moving the case in such a way that the first end portion and the second end portion are alternately heated by the heat source, wherein the heat source is fixed on a base surface.

In one embodiment, the thermoelectric converter system further includes a transmission member for fluidly connecting a first space with a second space, wherein the solid electrolyte divides the inside of the case into the first space corresponding to the first end portion and the second space corresponding to the second end portion.

In one embodiment, the thermoelectric converter system further includes a transmission driving unit for moving the working fluid from a first space to a second space or from the second space to the first space by fluidly connecting the first space with the second space, wherein the solid electrolyte divides the inside of the case into the first space corresponding to the first end portion and the second space corresponding to the second end portion.

Another embodiment of the present invention provides a method of thermionic electric conversion. The method includes: providing a case having a first end portion and a second end portion; providing a working fluid inside the case; dividing the inside of the case with a solid electrolyte; disposing a first electrode on a surface of the solid electrolyte; disposing a second electrode on another surface of the solid electrolyte; and alternatively heating the first end portion and the second end portion with a heat source.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Now, exemplary embodiments of the present invention will be described in more detail with reference to the accompanying drawings.

A unit thermionic electric converter 1 according to an embodiment of the present invention will be first described with reference to FIGS. 1A, 1B, and 2, and then a unit thermionic electric converter 100 according to another embodiment of the present invention will be described with reference to FIGS. 3 and 4.

Figure 1A:
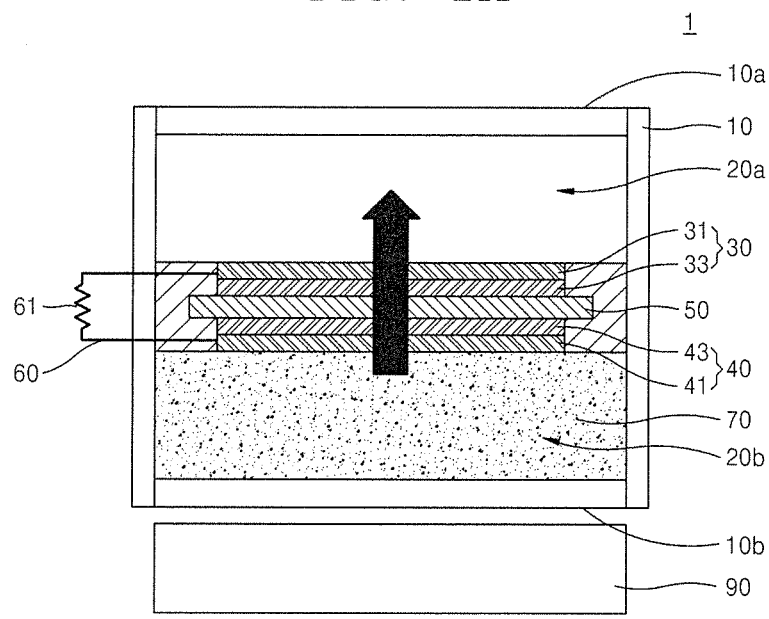
FIG. 1A is a schematic conceptual diagram illustrating a unit thermionic electric converter, according to an embodiment of the present invention.
Figure 1B:
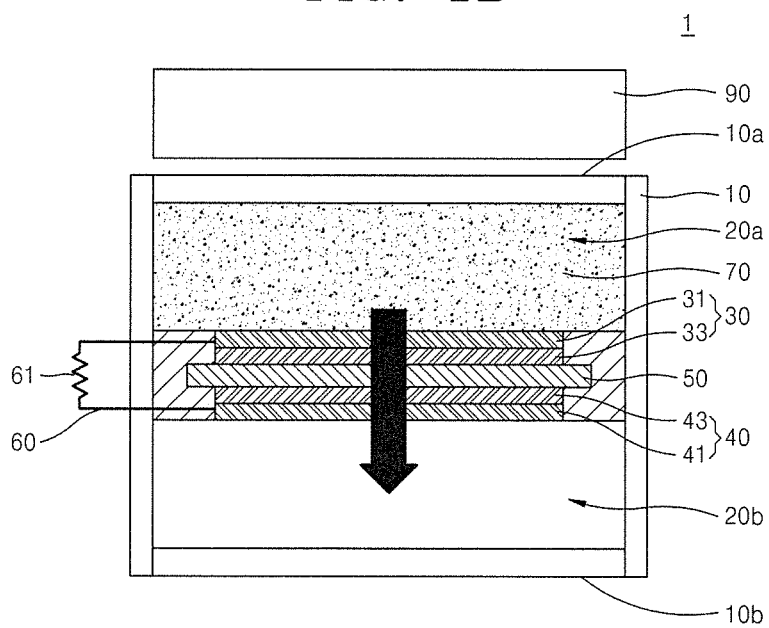
FIG. 1B is another schematic conceptual diagram illustrating the unit thermionic electric converter of FIG. 1, in which a heating direction is changed.

FIG. 1A is a schematic conceptual diagram illustrating the unit thermionic electric converter 1, according to an embodiment of the present invention. FIG. 1B is another schematic conceptual diagram illustrating the unit thermionic electric converter 1, in which a heating direction is changed. FIG. 2 is a schematic perspective view illustrating a combination of a first electrode 30, a second electrode 40, and a solid electrolyte 50, according to an embodiment of the present invention.

Referring to FIG. 1A, the unit thermionic electric converter 1 includes a case 10, the first electrode 30, the second electrode 40, the solid electrolyte 50, a working fluid 70, and a heat source 90. One of a first end portion 10a and a second end portion 10b may be a high temperature portion, and the other one may be a low temperature portion. The working fluid 70 may be filled in the case 10. The working fluid 70 may be formed of an alkali-based metal, such as sodium (Na). However, the present invention is not limited thereto, and thus the working fluid 70 may be formed of another alkali-based metal, such as lithium (Li), potassium (K), rubidium (Rb), and/or cesium (Cs).

The inside of the case 10 may be divided into a first space 20a and a second space 20b by the solid electrolyte 50. The first space 20a and the second space 20b may be formed in correspondence to the first end portion 10a and the second end portion 10b, respectively. Accordingly, when any one of the first end portion 10a and the second end portion 10b is a high temperature portion, the inside of the one of the first space 20a and the second space 20b corresponding thereto may be a high temperature portion having a temperature that is relatively higher than compared to a temperature of the other space. The solid electrolyte 50 may include beta (β)-alumina ($Na_20.11Al_2O_3$) and/or β"-alumina (β"-$Al_2O_3$).

Figure 2:
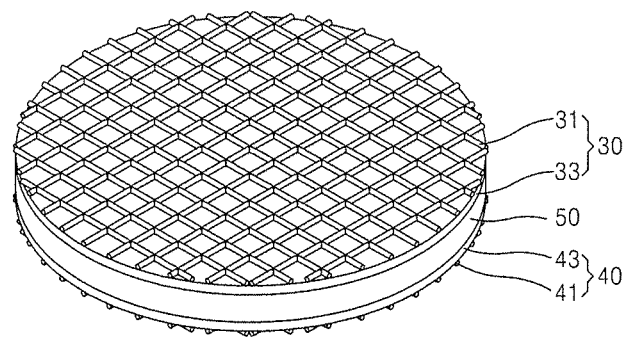
FIG. 2 is a schematic perspective view illustrating a combination of a first electrode, a second electrode, and a solid electrolyte, according to an embodiment of the present invention.

Referring to FIG. 2, the first electrode 30 may be disposed on a surface of the solid electrolyte 50, and the second electrode 40 may be disposed on another surface of the solid electrolyte 50. The first electrode 30 includes a first current collector 31 and a first porous electrode 33. The second electrode 40 includes a second current collector 41 and a second porous electrode 43. A surface of the first porous electrode 33 may have a porous structure so that a surface area thereof is relatively great and so that an alkali metal may easily move through. In addition, or instead, a surface of the second porous electrode 43 may have a porous structure so that a surface area thereof is relatively great and so that an alkali metal may easily move through. Each of or one of the first porous electrode 33 and the second porous electrode 43 receives or applies electrons from or to the working fluid 70. Each of or one of the first current collector 31 and the second current collector 41 may have a matrix structure. The first porous electrode 33 and the second porous electrode 43 may each include titanium nitride (TiN). Materials for forming the first porous electrode 33 and the second porous electrode 43 are not limited thereto, and any of various suitable materials may be used to form the first porous electrode 33 and the second porous electrode 43. The first current collector 31 and the second current collector 41 may each include molybdenum (Mo). Materials for forming the first current collector 31 and the second current collector 41 are not limited thereto, and any of various suitable materials may be used to form the first current collector 31 and the second current collector 41.

An operational principle of the first electrode 30, the second electrode 40, and the solid electrolyte 50 will be described below in more detail. The solid electrolyte 50 may have ion conductivity with respect to an alkali metal, but may function as an insulator with respect to electrons. For example, in FIG. 1A, when the second end portion 10b is heated by the heat source 90, the second space 20b may be a high temperature portion. By contrast, when the first end portion 10a is cooled, the first space 20a may be a low temperature portion. The working fluid 70 disposed in the second space 20b is ionized by sending electrons to the second porous electrode 43. The ionized working fluid 70 moves from the second space 20b to the first space 20a via the solid electrolyte 50 due to a density difference and/or a pressure difference of the working fluid 70 between the first space 20a and the second space 20b. The electrons sent from the working fluid 70 to the second porous electrode 43 move to the second current collector 41, and then move to the first current collector 31 via an external resistance 61 through a power generation unit 60. The first porous electrode 33 receives the electrons from the first current collector 31 and sends the electrons to the ionized working fluid 70 that has passed through the solid electrolyte 50 so as to neutralize the working fluid 70. The neutralized working fluid 70 is vaporized in the first space 20a by absorbing evaporation heat. The density difference and/or the pressure difference, which drives the movement of the working fluid 70, is increased as a temperature difference $\Delta T$ between the first end portion 10a and the second end portion 10b increases. That is, when the temperature difference $\Delta T$ between the first end portion 10a and the second end portion 10b is great, a vapor pressure difference between the first space 20a and the second space 20b is increased. Thus, the movement of the working fluid 70 becomes more active, thereby increasing the amount of power generated. For example, the working fluid 70 may be formed of Na. When the working fluid 70 is formed of Na, liquid Na in the second space 20b, which is a high temperature portion, is heated to a temperature of about 800K to about 1200K. A vapor pressure of Na may be in the range of about $1.1 \times 10^3$ Pa to about $1.56 \times 10^5$ Pa while the liquid Na is at the temperature of about 800K to about 1200K. When the solid electrolyte 50 is formed of β"-alumina (β"-Al$_2$O$_3$), Na ions (Na$^+$) having passed through the solid electrolyte 50 formed of β"-alumina receive electrons from the first electrode 30 and are thus neutralized. Then, the Na ions (Na$^+$) evaporate into the first space 20a, which may be a vacuum, and thus may condense in a low temperature portion of about 400K to about 700K. The low temperature portion may be cooled by using an air cooled method and/or a water-cooled method. The vapor pressure of Na may be in the range of about $3.8 \times 10^{-4}$ Pa to about $1.3 \times 10^2$ Pa.

In general, voltage and current characteristics of a thermionic electric converter may be obtained using a Nernst principle involving a concentration difference of chemical potential ($\mu$). When a pressure and temperature of a high temperature portion formed of β"-alumina (β"-Al$_2$O$_3$) are respectively $P_h$ and $T_h$, and when a pressure and temperature at a condensed surface are respectively $P_l$ and $T_l$, an output voltage across a cell may be obtained by Equation 1 below, $$V = \frac{RT_h}{F} \ln\left[\frac{P_h}{\left(\frac{T_h}{T_l}\right)^{1/2} P_l + (2\pi MRT_h)^{1/2}(i/F)}\right] - iR_0 \quad (1)$$

wherein, R denotes the gas constant, F denotes the Faraday constant, M denotes the atomic weight of Na, i denotes a current density, and $R_0$ denotes an internal resistance per unit area. Accordingly, a performance of the unit thermionic electric converter 1 may be determined by a temperature difference between the first end portion 10a and the second end portion 10b and a pressure difference therebetween according to the temperature difference.

A continuous operation of the unit thermionic electric converter 1 will be described below with reference to FIG. 1B. The heat source 90 may continuously operate the unit thermionic electric converter 1 by alternately heating the first end portion 10a and the second end portion 10b. That is, the first end portion 10a is heated in FIG. 1B, and the second end portion 10b is cooled in FIG. 1A, and thus a surface that is heated may be changed in the present invention. In the present embodiment, the first electrode 30 and the second electrode 40 may have the same structure and may be formed of the same material. Thus, even though a direction in which the working fluid 70 moves is changed, the first electrode 30 and the second electrode 40 may perform the same function. In other words, although in FIG. 1A the working fluid 70 moved from the second space 20b to the first space 20a so as to generate power, in FIG. 1B the working fluid 70 moves from the first space 20a to the second space 20b so as to generate power. At this time, a direction in which electrons move is changed, and thus a power generation unit 60 may include a circuit for changing a direction in which power flows. That is, the power generation unit 60 is electrically connected to the first electrode 30 and the second electrode 40 and changes a direction of current flow as the direction in which the working fluid 70 moves is changed. As such, the structure of the unit thermionic electric converter 1 may be simplified just by changing a portion of the unit thermionic electric converter 1 that is heated by the heat source 90 without using a device for circulating the working fluid 70, and thus the number of replacement parts may be reduced, thereby facilitating maintenance of the unit thermionic electric converter 1.

Now, the unit thermionic electric converter 100 according to another embodiment of the present invention will be described with reference to FIGS. 3 and 4. FIG. 3 is a schematic perspective view illustrating the unit thermionic electric converter 100. FIG. 4 is a schematic cross-sectional view taken along a line IV-IV' of FIG. 3.

Figure 3:
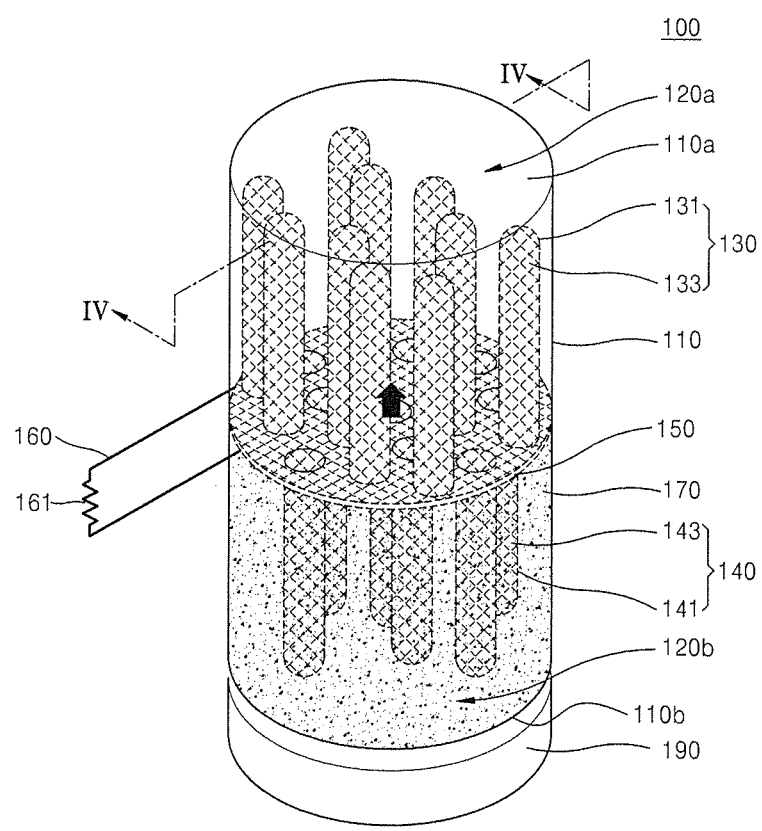
FIG. 3 is a schematic perspective view illustrating a unit thermionic electric converter, according to another embodiment of the present invention.
Figure 4:
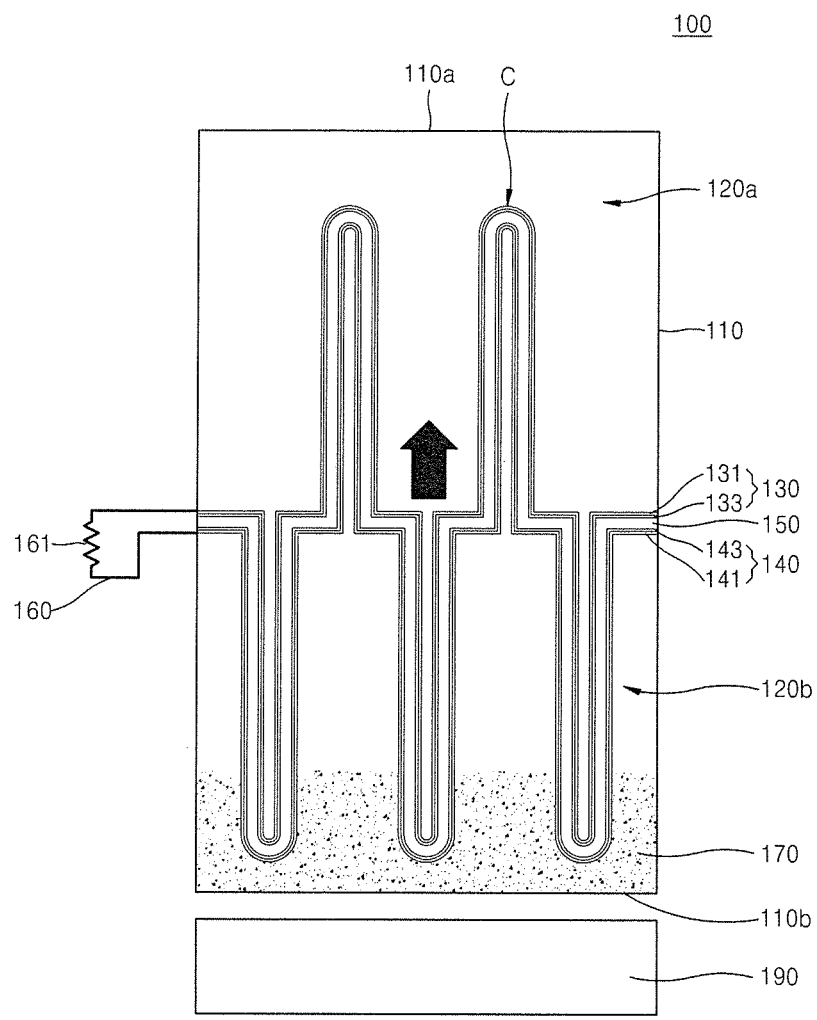
FIG. 4 is a schematic cross-sectional view taken along a line IV-IV' of FIG. 3.

Referring to FIG. 3, the unit thermionic electric converter 100 includes a case 110, a first electrode 130, a second electrode 140, a solid electrolyte 150, a working fluid 170, and a heat source 190. These components of FIG. 3 have the same function as those described with reference to FIGS. 1A, 1B and 2, and thus only a difference between the embodiments of FIGS. 3 and 4 and the embodiment of FIGS. 1A, 1B and 2 will be mainly described.

The first electrode 130, the second electrode 140, and the solid electrolyte 150 may each include a concave-convex surface (see FIG. 4) in order to increase surface areas thereof. This is just an example, and the concave-convex surface C may be formed to have any of various suitable shapes. Also, a first space 120a and a second space 120b may be formed symmetrically about each other, but the present invention is not limited thereto. When the surface areas of the first electrode 130, the second electrode 140, and the solid electrolyte 150 increase, the amount of working fluid 170 passing through the solid electrolyte 150 per unit area is increased, and thus the amount of power generated is also increased.

Figure 5:
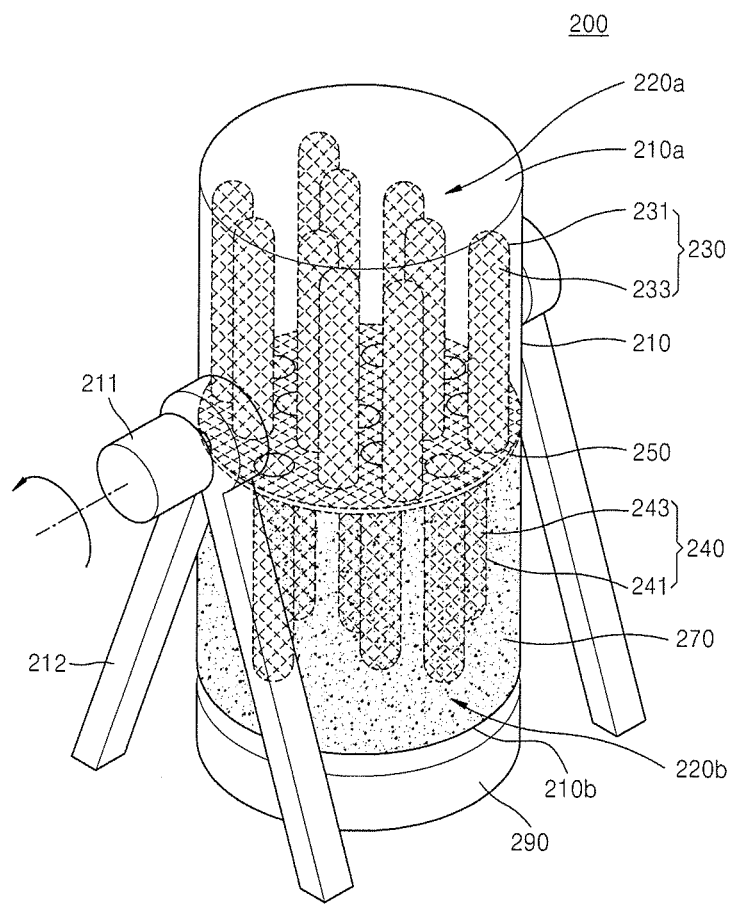
FIG. 5 is a schematic perspective view illustrating a unit thermionic electric converter, according to another embodiment of the present invention.
Figure 6:
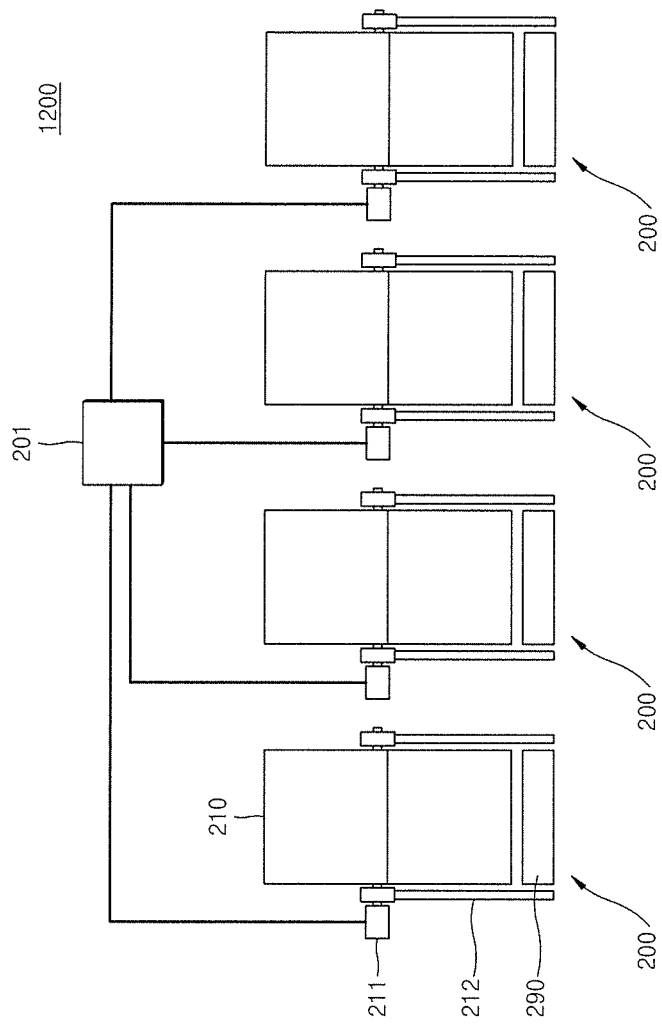
FIG. 6 is a conceptual diagram illustrating a thermoelectric converter system including a plurality of the unit thermionic electric converters of FIG. 5 and for sequentially rotating the unit thermionic electric converters, according to an embodiment of the present invention.

The heat source 190 may heat a first end portion 110a or a second end portion 110b of the case 110 by using any of various suitable methods. FIG. 5 is a schematic perspective view of a unit thermionic electric converter 200, according to another embodiment of the present invention. A method of alternately heating a first end portion 210a and a second end portion 210b while fixing a heat source 290 and moving a case 210 will be described with reference to FIG. 5. Referring to FIG. 5, the unit thermionic electric converter 200 includes the case 210, a first electrode 230, a second electrode 240, a solid electrolyte 250, a working fluid 270, the heat source 290, a driving unit 211 capable of rotating the case 210 with respect to the heat source 290, and a supporting unit 212. When the case 210 is rotated with respect to the fixed heat source 290, the heat source 290 may alternately heat the first end portion 210a and the second end portion 210b of the case 210 so as to generate power. At this time, when the driving unit 211 rotates the case 210, it takes time to cool a high temperature portion that was heated and to heat a low temperature portion that was cooled, and thus an output current and an output voltage are relatively decreased. Accordingly, in order to increase or decrease the current and voltage generated when the case 210 rotates, a plurality of the unit thermionic electric converters 200 may be sequentially rotated with respect to the fixed heat source 290. FIG. 6 is a conceptual diagram illustrating a thermoelectric converter system 1200 including a plurality of the unit thermionic electric converters 200 and for sequentially rotating the unit thermionic electric converters 200. The thermoelectric converter system 1200 may include a heat source adjusting device 201 and the plurality of unit thermionic electric converters 200. In the present embodiment, when the heat source 290 is fixed, a stable voltage and current may be generated while using the fixed heat source 290. The heat source adjusting device 201 is connected to each of the plurality of driving units 211 so as to control a driving relationship between the driving units 211. Thus, the heat source adjusting device 201 may increase or decrease the current and voltage generated by sequentially driving the plurality of driving units 211. At this time, the thermoelectric converter system 1200 may further include a power generation unit for controlling current generated in each unit thermionic electric converter 200 and outputting the current. That is, since each of the plurality of unit thermionic electric converters 200 may generate power having different magnitudes of voltage and different directions of current, the power generation unit may control the generated power so as to output a stable voltage and current.

The rotating of the case 210 is effectively used when the heat source 290 is fixed. For example, when it is difficult to change the location of the fixed heat source 290, such as with a nuclear reactor, waste heat of a plant, and/or geothermal heat, the thermoelectric converter system 1200 rotating the case 210 may be used.

Figure 7:
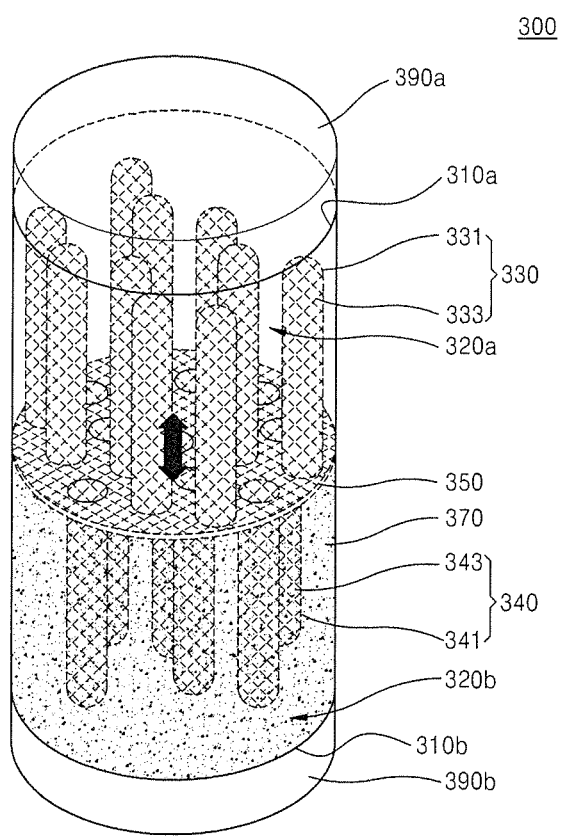
FIG. 7 is a schematic perspective view illustrating a unit thermionic electric converter, according to another embodiment of the present invention.
Figure 8:
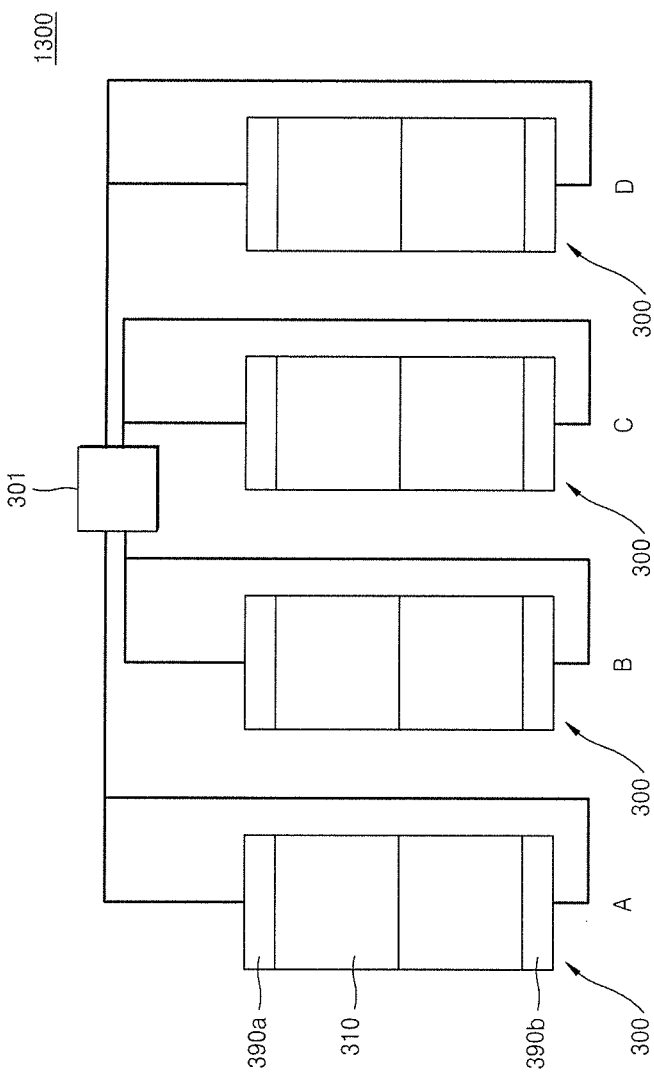
FIG. 8 is a conceptual diagram illustrating a thermoelectric converter system including a plurality of heat sources and for sequentially adjusting temperatures of the heat sources, according to another embodiment of the present invention.

On the other hand, when a location of a heat source may be changed with respect to a case or when portions of the case may be selectively heated by the heat source, the case may be fixed and the location of the heat source may be changed. FIG. 7 is a schematic perspective view illustrating a unit thermionic electric converter 300, according to another embodiment of the present invention. In FIG. 7, the location of a heat source 390 may be changed. Referring to FIG. 7, a first heat source 390a and a second heat source 390b are disposed at both end sides of a case 310, and the first heat source 390a and the second heat source 390b are heated according to a heat source adjusting device. For example, when the first heat source 390a disposed at a first end portion 310a is heated, the second heat source 390b disposed at a second end portion 310b may not be heated. Thus, the first end portion 310a is heated, and the second end portion 310b is cooled. Then, a temperature and a pressure of a working fluid 370 disposed in a first space 320a corresponding to the first end portion 310a increase, which causes the working fluid 370 to move to a second space 320b via a solid electrolyte 350. Afterwards, according to an adjustment by the heat source adjusting device, the second end portion 310b is heated by the second heat source 390b, and the first heat source 390a is not heated, and thus the first end portion 310a is gradually cooled. At this time, as a temperature and a pressure of the second space 320b increase, the working fluid 370 disposed in the second space 320b moves to the first space 320a via the solid electrolyte 350. A power generation unit connected to a first current collector 331 and a second current collector 341 generates power as the working fluid 370 loses or receives electrons while passing through the solid electrolyte 350. As such, the unit thermionic electric converter 300 may continuously generate power by sequentially heating the first heat source 390a and the second heat source 390b. FIG. 8 is a conceptual diagram illustrating a thermoelectric converter system 1300 including a plurality of the heat sources 390 of FIG. 7 and for sequentially adjusting temperatures of the heat sources 390, according to another embodiment of the present invention. The thermoelectric converter system 1300 includes a plurality of the unit thermionic electric converters 300 and a heat source adjusting device 301. The heat source adjusting device 301 may adjust magnitudes of current and voltage generated by sequentially changing a heating timing and a heating stop timing of the heat sources 390.

Figure 9:
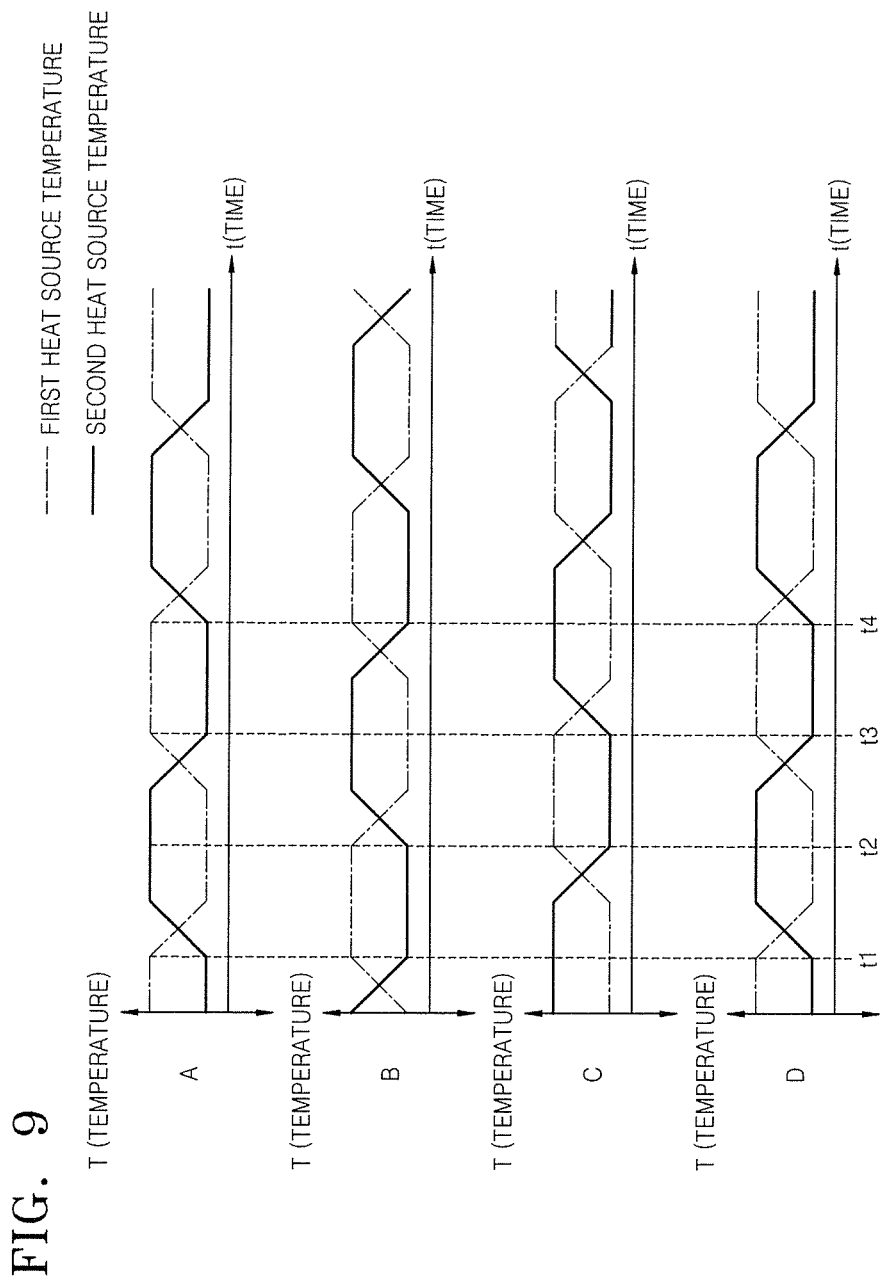
FIG. 9 is a graph showing sequentially adjusted temperatures of the heat sources of FIG. 8.

FIG. 9 is a graph showing sequentially adjusted temperatures of the heat sources 390 of FIG. 8. When the plurality of unit thermionic electric converters 300 illustrated in FIG. 8 from left to right are referred to as A, B, C and D, respectively, FIG. 9 illustrates a sequential adjustment of heating timings and heating stop timings of the first heat sources 390a and the second heat sources 390b of the A, B, C and D unit thermionic electric converters 300. Referring to FIG. 9, heating of the first heat source 390a of the A unit thermionic electric converter 300 is stopped at $t_1$, and then heating of the second heat source 390b of the A unit thermionic electric converter 300 may be started. Afterwards, heating of the first heat source 390a of the B unit thermionic electric converter 300 is stopped at $t_2$, and then heating of the second heat source 390b of the B unit thermionic electric converter 300 may be started. Afterwards, the heat source adjusting device 301 may increase or decrease current and voltage generated by the unit thermionic electric converter 300 by sequentially adjusting the heating timing of the heat sources 390 at $t_3$ and $t_4$. However, this is only an example, and the heat source adjusting device 301 may adjust the heating timing of the unit thermionic electric converters 300 by using any of various suitable methods so as to continuously generate power.

The thermoelectric converter system 1300 may include a power generation unit for controlling current generated in each unit thermionic electric converter 300 and outputting the current. That is, since each of the plurality of unit thermionic electric converters 300 may generate power having different magnitudes of voltage and different directions of current, the power generation unit may control the generated power so as to output stable voltage and current.

As such, fixing of the cases 310 and changing of the locations where the cases 310 are heated by the heat sources 390 may be used, for example, when a satellite rotating while traveling around the earth uses solar heat as a heat source or uses the heat sources 390 for electrically adjusting heating. However, this is only an example, and thus any of various suitable embodiments in which the cases 310 are fixed and the locations where the cases 310 are heated by the heat source 390 may be changed may be used.

Figure 10:
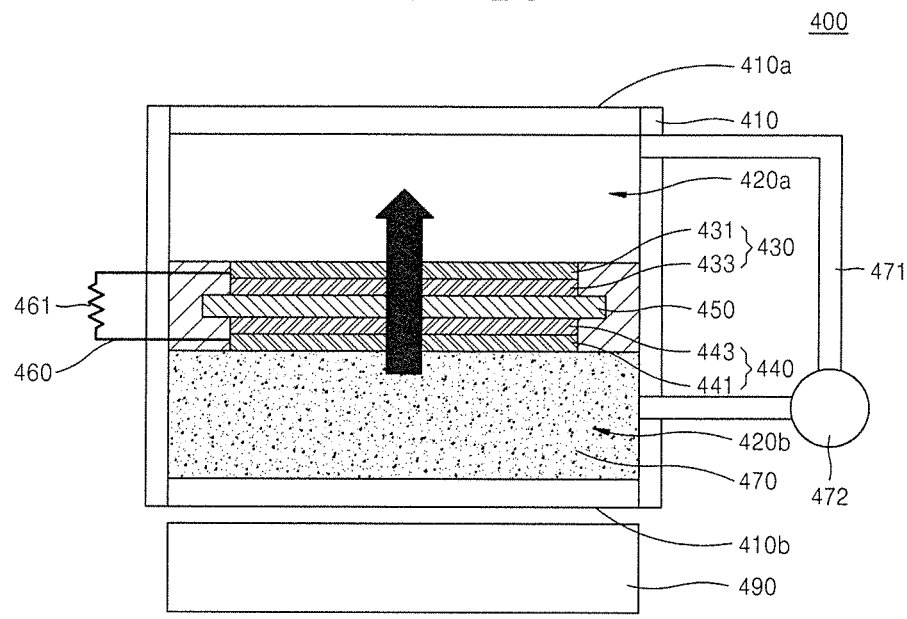
FIG. 10 is a schematic conceptual diagram illustrating a unit thermionic electric converter, according to another embodiment of the present invention.

FIG. 10 is a schematic conceptual diagram illustrating a unit thermionic electric converter 400, according to another embodiment of the present invention. Referring to FIG. 10, the unit thermionic electric converter 400 may include a first electrode 430, a second electrode 440, a solid electrolyte 450, a working fluid 470, a heat source 490, and a transmission driving unit 472. The transmission driving unit 472 may be a pump. The pump may connect a first space 420a and a second space 420b via a connecting pipe 471. For example, the pump moves the working fluid 470 condensed in a low temperature portion to a high temperature portion so as to allow power to be continuously generated. The pump may move the working fluid 470 from the first space 420a to the second space 420b or from the second space 420b to the first space 420a. The pump may be used together with the heat source 490 in order to sequentially heat a first end portion 410a and a second end portion 410b. For example, even when heating timings of a first end portion 410a and a second end portion 410b are changed, power may be continuously generated by the operation of the pump. For example, when the thermionic electric converter 400 installed in a satellite revolving the earth uses solar heat as a heat source, if a period in which the first end portion 410a and the second end portion 410b are heated by the heat source is 12 hours, power is continuously generated by circulating the working fluid 470 by using the pump for the 12 hours. Then, if the heated end portion is changed after 12 hours, the pump is operated in an opposite direction so as to continuously generate power. However, this is only an example, and thus the present invention is not limited thereto.

Figure 11:
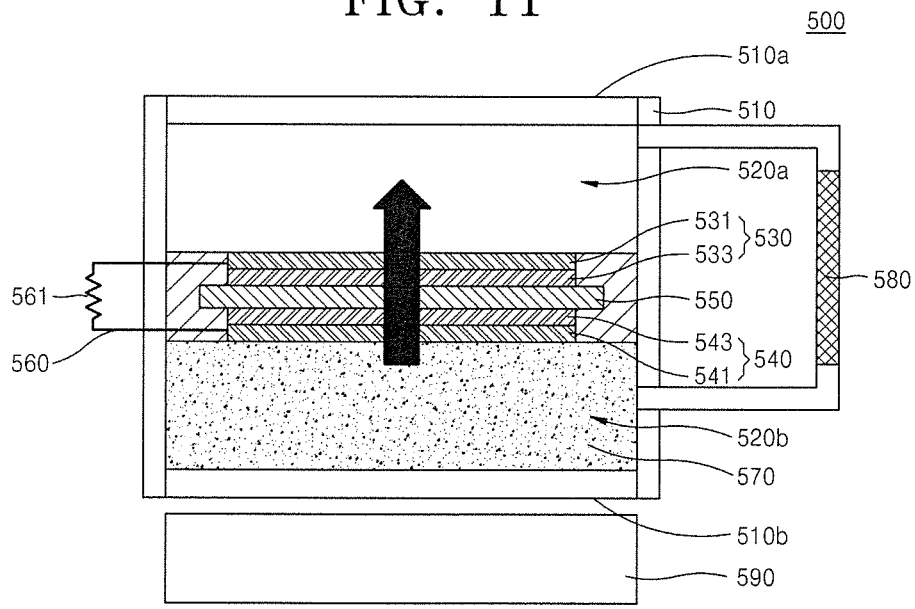
FIG. 11 is a schematic conceptual diagram illustrating a unit thermionic electric converter, according to another embodiment of the present invention.

FIG. 11 is a schematic conceptual diagram illustrating a unit thermionic electric converter 500, according to another embodiment of the present invention. Referring to FIG. 11, the unit thermionic electric converter 500 may include a case 510, a first electrode 530, a second electrode 540, a solid electrolyte 550, a working fluid 570, a heat source 590, and a transmission member 580. The transmission member 580 may be configured as a wick and may move the working fluid 570 between a first space 520a and a second space 520b by using a capillary phenomenon. The wick may move the working fluid 570 from the first space 520a to the second space 520b or from the second space 520b to the first space 520a, according to a capillary phenomenon. The wick may be used together with the heat source 590 in order to sequentially heat a first end portion 510a and a second end portion 510b.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A unit thermionic electric converter comprising:
a case having a first end portion and a second end portion;
a working fluid inside the case to move along a direction from the first end portion to the second end portion and from the second end portion to the first end portion of the case;
a solid electrolyte dividing the inside of the case;
a first electrode on a surface of the solid electrolyte;
a second electrode on another surface of the solid electrolyte,
wherein the first end portion and the second end portion are configured to be alternately heated by an external heat source external to the case and adjacent to at least the first end portion or the second end portion; and
a driving unit for moving the case in such a way that the first end portion and the second end portion are alternately heated by the heat source, wherein the heat source is fixed on a base surface.

2. The unit thermionic electric converter of claim 1, further comprising a power generation unit electrically connected to the first electrode and the second electrode and configured to control power generated in the thermionic electric converter.

3. The unit thermionic electric converter of claim 1, further comprising a transmission member for fluidly connecting a first space with a second space, wherein the solid electrolyte divides the inside of the case into the first space corresponding to the first end portion and the second space corresponding to the second end portion.

4. The unit thermionic electric converter of claim 1, further comprising a transmission driving unit for moving the working fluid from a first space to a second space or from the second space to the first space by fluidly connecting the first space with the second space, wherein the solid electrolyte divides the inside of the case into the first space corresponding to the first end portion and the second space corresponding to the second end portion.

5. The unit thermionic electric converter of claim 1, wherein the working fluid comprises an alkali-based metal.

6. The unit thermionic electric converter of claim 1, wherein the working fluid comprises sodium (Na).

7. The unit thermionic electric converter of claim 1, wherein the first electrode comprises a first porous electrode and a first current collector, and the second electrode comprises a second porous electrode and a second current collector.

8. The unit thermionic electric converter of claim 7, wherein the first porous electrode and the second porous electrode each comprise titanium nitride (TiN).

9. The unit thermionic electric converter of claim 7, wherein the first current collector and the second current collector each comprise molybdenum (Mo).

10. The unit thermionic electric converter of claim 1, wherein the solid electrolyte comprises $\beta''$-alumina($\beta''$—$Al_2O_3$).

11. A thermoelectric converter system comprising:
a plurality of unit thermionic electric converters;
a heat source adjusting device,
wherein each of the unit thermionic electric converters comprises:
a case having a first end portion and a second end portion;
a working fluid inside the case to move along a direction from the first end portion to the second end portion and from the second end portion to the first end portion of the case;
a solid electrolyte dividing the inside of the case;

a first electrode on a surface of the solid electrolyte; and
a second electrode on another surface of the solid electrolyte,
wherein the first end portion and the second end portion are configured to be alternately . heated by an external heat source external to the case and adjacent to at least the first end portion or the second end portion, and
wherein the heat source adjusting device is configured to adjust a heating time of the plurality of unit thermionic electric converters; and
a driving unit for moving the case in such a way that the first end portion and the second end portion are alternately heated by the heat source, wherein the heat source is fixed on a base surface.

12. The thermoelectric converter system of claim 11, further comprising a power generation unit for controlling power generated in each of the unit thermionic electric converters.

13. The thermoelectric converter system of claim 11, further comprising a transmission member for fluidly connecting a first space with a second space, wherein the solid electrolyte divides the inside of the case into the first space corresponding to the first end portion and the second space corresponding to the second end portion.

14. The thermoelectric converter system of claim 11, further comprising a transmission driving unit for moving the working fluid from a first space to a second space or from the second space to the first space by fluidly connecting the first space with the second space, wherein the solid electrolyte divides the inside of the case into the first space corresponding to the first end portion and the second space corresponding to the second end portion.

* * * * *